United States Patent [19]

Minami et al.

[11] 3,860,559
[45] Jan. 14, 1975

[54] METHOD OF PREPARING A SOLUBLE HIGH MOLECULAR WEIGHT AROMATIC POLYAMIDE IMIDE COMPOSITION

[75] Inventors: Muneyoshi Minami; Masaharu Taniguchi, both of Itsu, Japan

[73] Assignee: Toray Industries, Inc., Tokyo, Japan

[22] Filed: Feb. 22, 1973

[21] Appl. No.: 334,876

[52] U.S. Cl.... 260/47 CP, 117/124 E, 117/126 AB, 117/138.8 N, 161/197, 161/205, 161/227, 260/30.2, 260/33.4 P, 260/37 N, 260/78 A, 260/78 TF, 260/78.4 E
[51] Int. Cl............................................... C08g 20/32
[58] Field of Search..... 260/47 CP, 65, 78 TF, 78 A

[56] References Cited
UNITED STATES PATENTS

| | | | |
|---|---|---|---|
| 3,238,181 | 3/1966 | Anderson | 260/65 |
| 3,347,828 | 10/1967 | Stephens et al. | 260/47 |
| 3,575,891 | 4/1971 | Blanc et al. | 260/2.5 |
| 3,652,498 | 3/1972 | Morello et al. | 260/47 CP |
| 3,661,832 | 5/1972 | Stephens | 260/33.4 P |
| 3,691,136 | 9/1972 | Serres, Jr. et al. | 260/78 TF |
| 3,696,077 | 10/1972 | Suzuki et al. | 260/78 TF |
| 3,716,514 | 2/1973 | Morello | 260/33.4 P |
| 3,716,519 | 2/1973 | Yoda et al. | 260/47 CB |

*Primary Examiner*—Lester L. Lee

[57] ABSTRACT

A soluble solution of high molecular weight aromatic polyamide imide composition, having a degree of imidization of at least about 95%, is obtained directly in a one step heating process by reacting, at 200°–350°C, certain aromatic tricarboxylic acid and aromatic diamines with phosphorus compound as catalyst in a selected solvent, at a reactant concentration of 40–90%, and then diluting the reaction media with additional solvent as the reaction progresses.

11 Claims, No Drawings

METHOD OF PREPARING A SOLUBLE HIGH MOLECULAR WEIGHT AROMATIC POLYAMIDE IMIDE COMPOSITION

BACKGROUND OF THE INVENTION

1. Field of the Invention

This invention is concerned with a soluble high molecular weight aromatic polyamide imide composition, and shaped articles thereof, produced directly by reacting, with a particular class of catalysts, certain aromatic tricarboxylic acids and diamines in about equimolar ratio under specified conditions of temperature and solvent concentration.

2. Description of the prior art

It is well known that aromatic polyamide imide may be produced by reaction of (1) aromatic tricarboxylic anhydride chloride with diamine or (2) an aromatic tricarboxylic anhydride with diisocyanate.

As to the first method, the process consists of two steps; first, a polyamidic acid amide is prepared in solution at ordinary temperature by mixing the reactants, and then the resulting precursor polymer is ring-closed to polyamide imide by heating while evaporating the solvent. In this method, the process of making shaped articles is complicated and the properties of the resulting articles are often adversely affected by the water produced from the ring closing reaction during the shaping process.

As to the second method, while polyamide imide is profitably produced in one step in this method, control of the reaction is very difficult; gelation often occurs and linear high molecular weight polyamide imide is not produced satisfactorily. Further, the processability, the mechanical properties, and especially the heat resistant properties of the resultant polymer, are often impaired.

Furthermore, as to both of these methods, one of the starting reactants for each, namely tricarboxylic anhydride chloride and diisocyanate, respectively, is very sensitive to moisture. Thus, the reaction system in either case must necessarily be absolutely free from moisture and the procedure becomes very troublesome.

Other methods by which polyamide imide is produced by reacting tricarboxylic acid and diamine, as disclosed, for example, in U.S. Pat. Nos. 2,421,024 and 3,541,038, have also been known.

U.S. Pat. No. 2,421,024 essentially discloses reaction in a molten polymerization media including aliphatic tricarboxylic acid and diamine. On the other hand, the aromatic tricarboxylic acid and aromatic diamine of this invention are less reactive, particularly as compared to the aliphatic reactant in the cited prior art reference. Further, the polymer produced in the reactions of U.S. Pat. No. 2,421,024 is infusible. Therefore it was impossible, insofar as the present inventors are aware, to prepare a high performance polymer of excellent processability and physical properties by such molten polymerization method as disclosed in said patent.

U.S. Pat. No. 3,541,038 describes a method by which a polymer is prepared by adding inorganic oxyacids of boron, phosphonus and sulfur, etc., as a thermal stabilizer to a composition of aromatic polycarboxylic acid and diamine and heat-curing said mixture with reinforcement such as glass cloth. The polymer obtained by this method is, however, insoluble in organic solvent and even when crushed it is not shapable by compression.

SUMMARY OF THE INVENTION

An object of this invention is to provide an aromatic polyamide imide of high performance properties by a direct one step reaction of aromatic tricarboxylic acid and diamine, and thus to solve various problems of the prior art.

The present invention is intended to provide an improved polymerization procedure and a resulting polymer with improved properties, for example, various mechanical and thermal properties, shaping processability, and so on.

The present invention enables one to make a high performance polyamide imide by establishing a reaction procedure, wherein the reaction is carried out under specified conditions, especially by starting from a high concentration of reactants in a solution reaction media and diluting the solution as the reaction progresses, while the reactants are simultaneously polymerizing and ring closing.

The polyamide imide obtained by the method of this invention, as compared with the prior art, is distinctive because it is soluble in organic solvents, even though its imidization is almost complete and its molecular weight is very high.

The unique properties of the polyamide imide of this invention, such as excellent solubility, processability, mechanical properties, and so on, are probably to be attributed to high linearity of the structure of the polymer product and relatively less cross-linkage thereof as compared to prior art polymers of this type.

The polyamide imide of this invention is useful not only for compression molding but also for making films, fibers, etc. Further, because of its processability it is expected especially to be applied to molten shaping methods, being far superior to ordinarily used prior art casting materials.

DESCRIPTION OF THE PREFERRED EMBODIMENTS

A soluble and high molecular weight aromatic polyamide imide composition, of which the degree of imidization is above 95%, is prepared by a method which comprises the steps of 1. polymerizing and ring closing (a) an aromatic diamino compound and (b) an aromatic tribasic carboxylic acid compound having two carboxyl groups attached to adjacent carbon atoms either in acid form as anhydride, ester, amide, or ammonium salt derivative thereof, in about equimolar ratio, wherein said aromatic diamino compound has 1–3 benzene rings and 6–24 carbon atoms and said tribasic carboxylic acid compound has 1–3 benzene rings and 9–27 carbon atoms, in the presence of about 0.5–15 mole % of phosphonus compound, based on the reactants, selected from the group consisting of

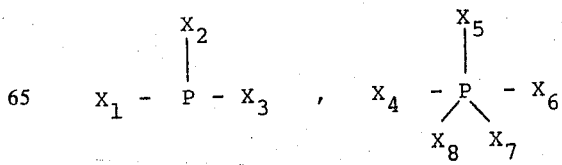

and intra- or inter- molecular condensates thereof, wherein $X_1$, $X_2$, $X_3$, $X_4$, $X_5$, $X_6$, $X_7$, and $X_8$ are a member each selected from the group consisting of

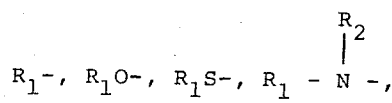

and azido and $R_1$ and $R_2$ are each a group selected from the group consisting of hydrogen, alkyl having 1–15 carbon atoms, cycloalkyl having 6–20 carbon atoms, aryl having 6–20 carbon atoms and heterocyclic radical having at least one atom of O, S, or N and having 5 or 6 ring member atoms, on which hydroxyl, alkoxyl, aryloxyl, mercapto, amino and/or halogen radical and so on may be substituted, in an organic solvent selected from the group consisting of an N-substituted lactam having the formula

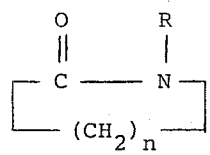

a quinoline having 9–11 carbon atoms and a phenol having 6–18 carbon atoms,
wherein R is alkyl having 1–8 carbon atoms or aryl having 6–8 carbon atoms and $n$ is an integer from 3 to 11,
at a temperature of from about 200°C. to about 350°C. with an initial concentration of reactants in the total mixture of 40–90% by weight and
2. diluting said mixture with said solvent to less than 40% by weight of reactant concentration as the polymerization reaction progresses.

The aromatic tricarboxylic acid component used in this invention may consist of an aromatic benzenoid radical ($C_6$–$C_{20}$) and/or a heterocyclic radical (including atoms of O, S, and/or N, etc.), of which 2–3 rings may be joined directly or with a divalent radical of alkylene ($C_1$–$C_3$), O, S, and/or sulphone, etc. Radicals, such as hydroxyl, alkoxyl, alkylamino or halogen, etc., may be introduced as substituents. At least two carboxylic groups are attached in the ortho or para- positions of these structures. Free acids of these aromatic tricarboxylic acid components are useful as are the anhydride, ester, amide and/or ammonium salts thereof. The useful esters or amides are derived with alcohol, secondary amines of aliphatic, cycloaliphatic or aryl radicals or $C_1$–$C_8$ and the ammonia and ammonium salts are derived with ammonia, secondary and/or tertiary aliphatic or cycloaliphatic amines.

Examples of these tricarboxylic acid components are trimellitic acid, 3,3'4'-diphenylsulphone tricarboxylic acid, 2,3,4'-diphenyl tricarboxylic acid, 3-methyl-4,3',4'-diphenylether tricarboxylic acid 2,3,6-pyridine tricarboxylic acid, 1,4,5-naphthalene tricarboxylic acid, etc., and anhydride, ester and/or amide thereof such as 1,3-dicarboxy-4-carbethoxy-5-chlorobenzene, 1,4-dicarboxy-3-N,N-dimethylcarbomoyl benzene, 1,4-dicarbomethoxy-3-carboxybenzene, 1,4-dicarboxy-3-carbophenoxybenzene, 2,6-dicarboxy-3-carbomethoxypyridine, 1,5-dicarbethoxy-6-carboxynaphthalene, 1,6-dicarboxy-5-carbamoyl naphthalene, etc., and ammonium salt thereof such as with ammonia, dimethylamine, triethylamine or methylcyclohexylamine, etc. In this invention trimellitic acid and trimellitic acid anhydride are most preferably used.

The aromatic diamine component used in this invention consists of aromatic benzenoid radicals ($C_6$–$C_{20}$) and/or heterocyclic radicals (including atoms of O, S, and/or N, etc.) of which 2–3 rings may be joined directly or with a divalent radical of alkylene ($C_1$–$C_3$), O, S, and/or sulphone etc., and radicals such as hydroxyl, alkoxyl, alkylamino or halogen, etc., may be introduced as substituents thereon (so long as two amino groups are not attached in adjacent positions thereon).

Examples of these diamines are m-phenylene diamine, p-phenylene diamine, 4-methyl-1,3-diamino benzene, 4,4'-diaminodiphenyl methane, 4,4'-diaminodiphenyl propane, 4,4'-diaminodiphenyl ether, 4,4'-diaminodiphenyl sulfide, 4,4'diaminodiphenyl sulphone, 3,4'-diaminodiphenyl ether, 3,3'-dichloro-4,4'-diaminodiphenyl methane, 3,3'-dimethoxy-4,4'-diaminodiphenyl methane, m-bis(p-aminophenoxy)benzene, p-bis(p-aminophenoxy)benzene or m-xylylene diamine, etc. In this invention, m-phenylene diamine, 4,4'-diaminodiphenyl methane, 4,4'-diaminodiphenyl ether, m-bis-(p-aminophenoxy)-benzene and p-bis-(p-aminophenoxy)benzene are most preferably used, with appropriate combinations of other reactants to produce copolymers with superior properties.

The phosphonus compounds preferably used as catalysts in this invention are represented by the general formula above described. Examples of these phosphonus compounds are triphenyl phosphite, tricresyl phosphite, tricyclohexyl phosphite, dimethyl-m-chlorophenyl phosphite, oxyethyl dipyridyl phosphite, diethyl hydrogen phosphite, phenyl dihydrogen phosphite, O-methyl-S,S'-diphenyl dithiophosphite, 0,0'-diphenyl-N,N'-dimethylamido phosphite, trianisyl trithiophosphite, N,N',N''-hexamethyl phosphonus triamide, 0,0'-di-n-butyl isocyanato phosphite, 0,0'-dimethyl isothiocyanato phosphite, tetrabutyl pyrophosphite, phenyl phosphonous acid, 0,0'-diphenyl-P-4-methoxycyclohexyl phosphonous acid, cyclohexyl phosphonous acid, N-N-dimethylamido-0-phenyl-P-methyl phosphonite, S-n-butyl-N,N-dimethylamido phenylphosphonite, di-n-butyl phosphinous acid, 0-cyclohexyl diphenyl phosphinite, S-methyl diphenylthiophosphinite, N,N-dimethyl diphenylphosphinous amide, phenylphosphenite, ethyl phosphenite, dimethyl ammonium dihydrogen phosphorous acid, 0-acetyl-diethylphosphonite, 0,0'-diethyl-P-thiocarbamoyl phosphonite, diethyl phosphinous azide, N,N-diethoxyphosphinoaniline, 1,2-bis(diethoxy phosphinoxy) ethane, 2-methoxy-1,3,2-dioxaphophorane, 2-methyl-1,2-oxaphosphorane, P-phenyl phosphorinane, 2-methyl-1-phenyl-1,2-azaphosphorane, trimethylsilyl diphenyl phosphite, triphenyl phosphate, tri-n-butyl phosphate, ethylphenyl hydrogen phosphate, diphenyl pyridyl phosphate, phosphoric acid, 0,0'-diphenyl-S-methylthiolo phosphate, 0,0'-diphenyl-N,N-dimethylamido phosphate, ethylene phenyl phosphate, triethyl trithiolophosphate, N,N', N''-hexamethyl phosphor amide, S-methyl N,N'-tetramethyldiamidothiolo phosphate, 0,0'-diphenyl isocyanato phosphate, 0,0'-dimethyl isothiocyanato phosphate, pyrophosphoric acid, tetrapolyphosphoric acid, trimetaphosphoric acid, ethyl metaphosphoric acid, triphenyl thionophosphate, 0,0'-di-P-chlorophenyl-N,N'-dimethylamido thionophosphate, phenyl phosphonic acid, 0,0'-diphenyl P-cyclohexyl phosphonate, S,S'-dimethyl thiolophosphonate, P- phenyl-N,N'-tetramethyldiamido phosphonate, phenyl thionophosphonic acid, 0,0'-diphenyl-P-methyl thionophosphonate, diphenyl phosphinic acid, P-dimethylamino phenyl thionophosphinate, triphenyl phosphine oxide, phosphorous pentoxide, meta phosporic acid, ammonium dihydrogen phosphoric acid, P-benzoylphosphonic acid, 0,0'-diethyl-P-carbethoxy phosphonate, 0-acetyl diphenyl phosphate, dimethyl thiophosphor azide, tetraethyl pyrophosphate, N,N-bis(diethoxyphosphinyl)aniline, 1,2-bis(dimethyl thiophosphoryl)ethane, 0-(diethoxy phosphino)-0',0''-diethyl phosphate, bis-(dimethoxy phosphoryl)sulfide, 2-oxo-2 -phenyl-1,3,2,-dithiaphosphorane, 2-thiono-2-methyl-4,5-benz-1,3,2-thiazaphosphorine, 2-oxo-2-methyl-1,3-dioxa-4,2-oxophosphorinane, 1-phenyl phosphorine-3-oxide or P-diethyltrimethylsilyl phosphate, etc. Among these phosphorus compounds, the preferred compounds are those having at least two, or more desirably three, radicals selected from the group consisting of OH, SH, and esters and amides thereof. Examples of these compounds include phosphorous acid, phosphonous acid, i.e., phenyl phosphonous acid, etc., phosphoric acid, phosphonic acid, i.e., phenyl phosphonic acid, etc., and alkyl ($C_1$—$C_7$)— or aryl (i.e., phenyl, cresyl, etc.)- ester, and/or dialkyl ($C_1$—$C_7$)—, diaryl (i.e., phenyl)-, or alkyl aryl-amides thereof.

Organic solvents which may be used in this invention include N-substituted lactam (with the aliphatic or aryl group of $C_1$—$C_8$), quinoline and phenol. Following are examples of these solvents: N-methyl pyrrolidone, N-ethyl pyrrolidone, N-butyl pyrrolidone, N-phenyl pyrrolidone, N-phenyl piperidone, N-methyl caprolactam, N-phenyl-r-valerolactam, N,N'-ethylene dipyrrolidone, P-phenylene dipyrrolidone, quinoline, 5-methyl quinoline, 6-chloro quinoline, isoquinoline, phenol, cresol, xylenol, chlorophenol, quajacol, p-phenyl phenol and a ($\beta$ -) naphthol, etc. The most preferred compounds are N-methyl pyrrolidone, N-phenyl pyrrolidone, quinoline and/or cresol. While these three kinds of solvent are not the same, they offer similar effects in the improvement of the properties of the polymer product.

The polyamide imide of this invention is prepared by reacting the above-mentioned aromatic tricarboxylic acid component and diamine component in about equimolecular amounts, in the manner described above. It is especially important in this invention to carry out the reaction starting with a high concentration of reactants, i.e., 40–90 wt. %, preferably 50–70 wt. %, and diluting the solution with solvent as the reaction progresses, so as to obtain a polyamideimide with high molecular weight and excellent properties. The dilution is continued preferably to a reactant concentration of 30 wt. % or even 20 wt. % at the end of the reaction. It is most effective to add the solvent in many small portions, although it may also be added in a single portion heated to an elevated temperature. The catalyst is generally added in an amount of about 0.5–15 mol %, preferably 1–10 mol % and most preferably 3–8 mol %; the reaction is generally performed at a temperature of 200°–350°C., preferably 210°–270°C., and for an overall time of from 2 to between 10 and 20 hours. Volatile components, such as water, alcohol, etc., produced in the course of reaction, should be distilled off, as a practical polymerization rate cannot be attained if these volatile components exceed a certain critical concentration.

The role of the foregoing factors is not so clear. However, the combination of these conditions probably contributes to repress undesired cross-linking and the formation of a structure of high molecular linearity, resulting in superior solubility, moldability, mechanical properties, etc. These effects, it should be noted, are very specific for the reaction of the aromatic tricarboxylic acid and diamine of this invention, and are not the same for other reactions, such as for example, of aromatic tricarboxylic acid anhydride chloride and diamine, aromatic tricarboxylic acid and diisocyanate, aromatic tetracarboxylic anhydride and diamine or aliphatic polycarboxylic acid and diamine, etc. Although the polyamide imide obtained by the method of this invention is of high molecular weight and almost completely imidized, i.e., closed ring, it is distinctive for its excellent properties, such as being soluble in organic solvent and readily moldable.

This invention is not limited to polymers obtained from the diamino compounds and the tribasic carboxylic acid compounds defined above as sole reactants. It is within the scope of this invention to include other additional polyamide forming reactants. It is possible, for example, to replace a part of the tribasic carboxylic acid compound with an aromatic dicarboxylic acid or to replace a part of the tribasic carboxylic acid compound and the diamine compound with an aromatic aminocarboxylic acid, whereby the properties of the polymer are variously modified, by copolymerization, with respects to strength, elongation, abrasion, endurance in folding, adhesion, hygroscopicity, etc. Surprisingly, these resulting copolymers can be obtained in solution while the dicarboxylic acid or aminocarboxylic acid product alone cannot form a homogeneous solution.

Aromatic dicarboxylic acid components and aromatic aminocarboxylic acid components used in this invention consist of aromatic benzenoid radicals ($C_6$—$C_{20}$) and/or heterocyclic radicals (including atoms of O, S, and/or N, etc.), of which 2–3 rings may be joined directly or with two valent radicals of alkylene ($C_1$—$C_3$), O, S, and/or sulphone, etc., and radicals such as hydroxyl, alkoxyl, alkylamino or halogen, etc., may be introduced as substituents. And further, these acid components are useful as free acid, acid anhydride, ester, amide and/or ammonium carboxylic acid salt, of which esters or amides are derived with aliphatic, cycloaliphatic or aryl radicals ($C_1$—$C_8$), and ammonium salts are derived with ammonia, sec- and/or tert- aliphatic or cycloaliphatic amine.

Examples of these aromatic dicarboxylic and aminocarboxylic components are terephthalic acid, isophthalic acid, 4,4'-diphenyldicarboxylic acid, 4,4'-diphenylmethane dicarboxylic acid, 2-methoxydiphenylether-4,4'-diphenyl sulphone dicarboxylic acid, dimethyl telephthalate, diethyl isophthalate, 4-chloro-dimethyl isophthalate, dicyclohexyl terephthalate, diphenyl isophthalate, 3-carbethoxy benzoic acid, N,N'-tetramethyl isophthalamide, trimethylammonium salt of isophthalic acid, p-aminobenzoic acid, m-aminobenzoic acid, 1-aminonaphthoic acid, 4-aminophenoxybenzoic acid, 4-(p-aminobenzyl) benzoic acid, methyl-m-aminobenzoate, phenyl-p-aminobenzoate, methyl-p-aminophenoxybenzoate, p-aminobenz diethylamide and dimethylammonium salt of m-aminobenzoic acid, etc. These acid components can be used together with aromatic tricarboxylic acid in an amount less than about 90 mol % preferably less than about 80 mol %, and most preferably less than about 60 mol % based on the total polycarboxylic acid compounds. Further, these amino acid compounds are able to be used together with the tribasic carboxylic acid compound and the diamino compound in an amount of less than 90 mol %, preferably less than about 80 mol %, and most preferably less than about 60 mol % based on the total reactants. Each component of these kind of acids or amino acids is in general difficult to be polymerized into useful high molecular weight polymer, whereas, in this embodiment of the present invention, the reaction proceeds smoothly and a polymer of excellent properties is readily obtained when it is used as a reactant together with the tricarboxylic acid and diamino compound of this invention.

The aromatic polyamide imide produced by the method of this invention usually has an inherent viscosity of 0.3 and preferably is above 0.4 or 0.5 which is measured in a concentration of 0.5 wt. % of polymer in N-methyl pyrrolidone solution at 30°C., the substantially homogeneous solution of high molecular polyamide imide thus obtained, which is almost completely imidized, is used to make various shaped articles as follows.

For molding, the polymer solution is poured into a non-solvent and the precipitate is well washed, filtered, dried, powdered and further heat treated (above 200°C.) to produce a molding polymer powder. When this powder is compressed, at about 300°–400°C. and a pressure of about 50–300 kg/cm$^2$, there is obtained a well bonded shaped article of high strength. Reinforced, heat resistant, shaped articles can also be obtained by mixing the powder, prior to compressing it, with various reinforcements and/or fillers, such as glass, carbon, metal, polyimide, or polyamide fibers, asbestos, metal powder, alumina, etc., in a proportion of from 10 to 60 wt. %. A composite molding material can also be obtained by immersing a shaped structural reinforcement into a polymer solution and then precipitating and forming a final product in a manner similar to that described above.

As for the manufacturing of film or fiber, the polymer solution is directly applied, in a dry casting procedure; however, the isolated polymer can also be processed in a molten state with adequate additives. As for the manufacturing of laminate, a cloth or mat of glass, carbon fiber, asbestos or polyamide, etc., is impregnated with the polymer solution, dried and precured by heating. The resultant prepreg is then usually pressed at 200°–400°C. under a pressure of 50–200 kg/cm$^2$.

In this invention, the degree of imidization, which is defined as the ratio of imide bonds formed to the total available bonds to be imidized, has been estimated by IR spectroscopy.

EXAMPLE 1

19.21g (0.1 mole) of trimellitic anhydride and 19.83g (0.1 mole) of 4,4'-diaminodiphenyl methane were added to 16.7g of N-methyl pyrrolidone, and 0.8g of triphenyl phosphite was added to this mixture. The initial concentration of reactants in the total mixture was 69.6% by weight. The reaction mixture was stirred under a stream of dry nitrogen for 7.5 hours at 205°–210°C., while N-methyl pyrrolidone was added in quantities of 9g after 3 hours, 6g after 4 hours, 7g after 5 hours, 9g after 6.5 hours, and 60g toward the end of the reaction period. During the reaction, the water was distilled off as it was produced. The inherent viscosity of the resulting polymer was 0.65, measured in a solution of N-methyl pyrrolidone at 30°C. The degree of imidization of the polymer was over 95% at a concentration of 0.5%.

A portion of this solution was spread on a glass plate so that the thickness of dried film was 50 microns. The glass plate was left to stand inside an oven at 80°C. for an hour and cured at 250°C. for an hour. A tenacious film was obtained, of which the tensile strength was 13.1 kg/mm$^2$, elongation was 12.1% and the endurance to folding was 455 times. When the film was heated at 180°C. for 100 hours, substantially no change was observed in the physical properties.

Another portion of polymer solution was mixed with 20% by weight of 3 mm long chopped strands of carbon fiber and poured into a quantity of vigorously stirred water. The precipitate was filtered, washed well and dried at 250°C. for 2 hours under a reduced pressure. The compounds thus obtained were compressed at 360°C. under a pressure of 200 kg/cm$^2$. The molded composite plate exhibited flexural strength of 24 kg/mm$^2$ and a modulus of 966 kg/mm$^2$.

EXAMPLE 2

19.21g (0.1 mole) of trimellitic anhydride and 10.62g (0.1 mole) of meta-phenylene diamine were added to 12.8g of N-methyl pyrrolidone and 0.4g of triphenyl phosphate was added to this mixture. The initial concentration of reactants in the total mixture was 69.3% by weight. The mixture was stirred under a stream of dry nitrogen for 6 hours at 210°–215°C. while N-methyl pyrrolidone was added in quantities of 10g after 3.5 hours, 13g after 5 hours and 70g toward the end of the reaction period. During the reaction, water was distilled off as it was produced. The inherent viscosity of the resulting polymer was 0.53. A tenacious film of good mechanical properties was obtained similar to that described in Example 1.

EXAMPLE 3

19.21g (0.1 mole) of trimellitic anhydride and 5.31g (0.05 mole) of meta-phenylene diamine were added to 14.7g of N-methyl pyrrolidone and 0.4g of tri-n-buthyl phosphite was added to this mixture. The initial concentration of reactants in the total mixture was 69.6% by weight. The reaction mixture was stirred under a stream of nitrogen for 1 hour at 200°C. Thereafter, 10.0g (0.05 mole) of 4,4'-diamino diphenyl ether was added to the system and the mixture was stirred for 6 more hours at 210°–215°C, while N-methyl pyrrolidone was added in quantities of 10g after 4.5 hours, 13g after 5 hours, and 70g toward the end of the reaction period. The inherent viscosity of resulting polymer was 0.51.

A tenacious film was obtained similar to that described in Example 1. The tensile strength of the film was 10.2 kg/mm$^2$, the elongation was 9.3%, and the endurance to folding was 230 times.

EXAMPLE 4

19.21g (0.1 mole) of trimellitic anhydride, 5.31g (0.05 mole) of meta-phenylene diamine and 14.6g (0.05 mole) of meta-bis(4-aminophenoxy)benzene were added to 18g of N-methyl pyrrolidone, and 0.4g of triphenylphosphate was added to this mixture. The initial concentration of reactants in the total mixture was 68.0% by weight. The reaction mixture was stirred under a stream of nitrogen for 7 hours at 210°–215°C., while N-methyl pyrrolidone was added in quantities of 10g after 3 hours, 13g after 5 hours and 70g toward the end of the reaction period. During the reaction, the resulting water was distilled off as it was produced. The inherent viscosity of obtained polymer was 0.62. The 95%. of imidization of the polymer was over 95%.

A tenacious film of this polymer, formed as described above had a tensile strength of 10.6 kg/mm$^2$, an elongation of 17.1%, and an endurance to folding of 700 times. The film was measured at a size of 50 microns thick and 10 mm wide under load of 1 kg. Even when the film was heated at 200°C. for 100 hours, its physical properties did not change substantially.

EXAMPLE 5

In several experiments otherwise identical to that described in Example 4, phenyl phosphonic acid, 0,0'-diphenyl cyclohexylphosphonate, ammonium dihydrogen phosphate, N,N-dimethylammonium dihydrogen phosphate, N,N',N''-hexamethyl phosphor amide, phenyl phosphonous acid, 1,2-bis(diphenoxy phosphoryl) ethane and tetrabutyl pyrophosphite were used, respectively, instead of triphenyl phosphate. The inherent viscosities of the resulting polymers were, respectively, 0.59, 0.56, 0.51, 0.54, 0.53, 0.57, 0.55 and 0.56 and the films prepared similarly to those described in foregoing Examples exhibited good mechanical properties, for example, at least a few hundred times of endurance to folding, etc.

EXAMPLE 6

21.01g (0.1 mole) of trimellitic acid and 19.83g (0.1 mole) of 4,4'-diaminodiphenyl methane were added to 9.8g of N-methyl pyrrolidone, and 0.4g of phosphoric acid was added to this mixture. The initial concentration of reactants in the total mixture was 80% by weight. The reaction mixture was stirred for 5.5 hours at 210°–215°C., while N-methyl pyrrolidone was added in quantities of 6.9g after 1.5 hours, 9.3g after 2.5 hours, 13g after 3.5 hours, 8.7g after 4 hours and 80g toward the end of the reaction period. During the reaction, water was distilled off as it was produced. The inherent viscosity of polymer was found to be 0.56.

A tenacious film was obtained as described in Example 1. The tensile strength of the film was 11 kg/mm$^2$, and the elongation was 15%.

Another portion of the diluted solution was added to water, and polymer was gathered as precipitate. This precipitate was washed well with methanol and dried inside an oven at 250°C. for 3 hours under reduced pressure. Thereafter, the polymer was powdered and compressed in a mold at 350°C. and a translucent molded plate was obtained, of which the flexural strength was 17.4 kg/mm$^2$, the flexural modulus was 346 kg/mm$^2$, the tensile strength was 10.6 kg/mm$^2$, and the impact strength (notched izod) was 4.3 kg-cm/cm notch.

EXAMPLE 7

19.21g (0.1 mole) of trimellitic anhydride and 19.83g (0.1 mole) of 4,4'-diaminodiphenyl methane were added to 26g of quinoline, and 0.2g of triphenyl phosphite was added to this mixture. The initial concentration of reactants in the total mixture was 59.8%. The reaction mixture was stirred for 1.5 hours at 235°C. Thereafter, 35g of quinoline was added to the system and the solution was stirred for an additional 2 hours at 235°C. Toward the end of the reaction period, 160g of quinoline was added to the solution. During the reaction, water was distilled off as it was prepared. The inherent viscosity of the resulting polymer was found to be 0.64, and the degree of imidization of the polymer was over 95%.

A portion of this solution was spread on a glass plate so that the thickness of the cured film would be 50 microns. The glass plate was left to stand inside an oven at 80°C. for 2 hours and cured at 260°C. for an hour. A tenacious film was obtained, of which the tensile strength was 12.5 kg/mm$^2$, and the elongation was 11.5%.

Still another portion of the diluted solution was added to methanol, and the polymer was gathered as precipitate. This powder was washed well with methanol and dried inside an oven heated to 250°C. in the course of 5 hours under a reduced pressure. Thereafter, the powder was compressed in a mold at 325°C. and a translucent molded plate was obtained, of which the flexural strength was 14.2 kg/mm$^2$.

EXAMPLE 8

A reaction similar to that described in Example 7 was performed but instead of trimellitic anhydride, 23.81g of trimellitic acid mono methyl ester was used. (This compound is prepared by heating trimellitic anhydride and methanol). The initial concentration of reactants in the total mixture was 62.5% by weight. The inherent viscosity of the resulting polymer was 0.61. A tenacious film of good mechanical properties was obtained as described in Example 7.

EXAMPLE 9

19.21g (0.1 mole) of trimellitic anhydride, 5.31g (0.05 mole) of meta-phenylene diamine and 14.62g (0.05 mole) of meta-bis(4-aminophenoxy) benzene were added to 30g of meta-cresol, and 0.4g of phosphorous acid was added to this mixture. The initial concentration of reactants in the total mixture was 56% by weight. The reaction mixture was stirred at 210°–215°C. for 5 hours while meta-cresol was added in quantities of 10g after an hour, 10g after 2 hours, 10g after 3 hours and 70g toward the end of the reaction period. During the reaction, 30g of meta-cresol and water produced in the reaction wre distilled off. The inherent viscosity of polymer was 0.46. The degree of imidization of the polymer was over 95%.

A tenacious film of good characteristics was obtained similar to that described in Example 7.

EXAMPLE 10

Substituting lepidine for the quinoline of Example 7, a reaction similar to that described in Example 7 was performed. The initial concentration of reactants in the total mixture was 59.8% by weight. The inherent viscosity of the resulting polymer was 0.56. A tenacious film was obtained similar to that described in Example 7.

EXAMPLE 11

Instead of N-methyl pyrrolidone as in Example 4, N-ethyl piperidone was used in an otherwise similar experiment. The inherent viscosity of the resulting polymer was 0.54. A tenacious film was obtained similar to that described in Example 4.

EXAMPLE 12

In reactions otherwise similar to Example 7, triphenylthiolo phosphite, 0,0'-di-n-butyl isocyanato phosphite, triphenylthiolo phosphate, triphenylthiono phosphate, 0,0'-diethoxy cyano phosphate, trimethylsilyl-0,0'-diethyl phosphate, or 2-hydroxy-2-oxo-1,2,3-dioxaphospholan were used instead of triphenyl phosphite. The inherent viscosities of the resulting polymers were, respectively, 0.53, 0.58, 0.56, 0.55, 0.57, 0.55 or 0.52 and a tenacious film, similar to that in Example 7, was obtained in each case.

EXAMPLE 13

13.2g (0.08 mol) of isophthalic acid, 3.84g (0.02 mole) of trimellitic anhydride, and 19.83g (0.1 mol) of 4,4'-diaminodiphenyl methane were added to 9.3g of N-methyl pyrrolidone and 0.37g of triphenyl phosphite was added as a catalyst to this solution. The initial concentration of reactants in the total mixture was 79.2% by weight. The reaction mixture was stirred and heated at 210°–215°C. in a nitrogen atmosphere. N-methyl pyrrolidone was added to the system in quantities as follows: after an hour from the start of this reaction, 5g; after 3 hours, 8.9g; after 6 hours, 5.9g; finally 90g were added toward the end of the reaction period. The reaction system was stirred and heated for 8 hours total and water was distilled off over the time of reaction as it was produced. The inherent viscosity of the resulting polymer was 0.52 measured in a 0.5% N-methyl pyrrolidone solution at 30°C. The infrared spectrum of this polymer showed the presence of nearly completed imide ring formation in the polyamide chain (nearly fully imidized). The phosphite catalyzer acted on this system not only as a reaction accelerator, but also as an improver of the properties of the resulting polymer.

A portion of this solution was cast upon a glass plate so that the thickness of the film was 50 microns. The film on the glass plate was dried at 80°C. for an hour, and further heated at 250°C. for an hour. The tenacious film thus obtained displayed the following mechanical properties; tensile strength, 11.5 kg/mm$^2$; and elongation — 14%.

EXAMPLE 14

9.97g (0.6 mol) of isophtalic acid, 7.68g (0.04 mol) of trimellitic anhydride, and 10.61g (0.1 mol) of m-phenylene diamine were added to 18.9g of quinoline and 0.56g of triphenyl phosphate were added as a catalyst to this solution. The initial concentration of reactants in the total mixture was 59.2% by weight. The mixture was maintained under a nitrogen atmosphere as it was stirred and heated at 235°–240°C. An hour after the reaction started, 23.6g of quinoline were added to this solution. Thereafter, the mixture was heated for an additional 2.5 hours, and toward the end of the reaction period, 60g of N-methyl pyrrolidone were added. Water was distilled off throughout the reaction period as it was produced. The inherent viscosity of the resulting polymer was 0.55. Phosphite catalyst acted on the system not only as reaction accelerator, but also as an improver of the properties of polymer.

This solution was spread on a glass plate so that the thickness of the film was 50 microns, dried over a period of 2 hours at 80°C. and thereafter heated at 260°C. for an hour. The tenacious film thus obtained displayed the following mechanical properties; tensile strength, 10.1 kg/mm$^2$; elongation — 10.8%.

EXAMPLE 15

12.31g (0.1 mol) of m-aminobenzoic acid, 9.61g (0.05 mol) of trimellitic anhydride, and 5.31g (0.05 mol) of m-phenylenediamine were mixed in 18.1g of quinoline. 0.3g of triphenyl phosphite were added to this solution as a catalyst. The initial concentration of reactants in the total mixture was 59.7% by weight. The reaction mixture was stirred and heated to 235°–240°C. in a nitrogen atmosphere. After 2.5 hours from the start of the reaction, 22.8g of quinoline was added to the system, and after 3.5 hours, the system was diluted with 70g of N-methyl pyrrolidone. Water produced during the time of reaction was distilled off. The inherent viscosity of the polymer was 0.42. The infrared spectrum of this polymer showed the presence of nearly complete imide ring formation in the polyamide chain. The phosphite catalyzer acted on this system not only as a reaction accelerator, but also as an improver of the properties of the polymer.

A tenacious film was prepared from this polymer, as described in Example 14. The resultant film displayed the following mechanical properties: tensile strength, 10.5 kg/mm$^2$, and elongation — 9.5%.

EXAMPLE 16

12.31g (0.01 mol) of m-aminobenzoic acid, 9.61g (0.05 mol) of trimellitic anydride, and 9.91g (0.05 mol) of 4,4'-diaminodiphenyl methane were mixed in 7.9g of N-methyl pyrrolidone. 0.6g of triphenyl phosphate were added to this solution as a catalyst. The initial concentration of reactants in the total mixture was 78.9% by weight. As the mixture was maintained under a nitrogen atmosphere, it was stirred and heated at 210°–215°C. After 5 hours from the start of the reaction, 5.7g of N-methyl pyrrolidone were added to the system, and then, after 6 hours, 7.6g of N-methyl pyrrolidone and, after 7 hours, 50g were also added. Water was distilled off during the time of reaction. The inherent viscosity of the polymer was 0.38, measured in N-methyl pyrrolidone, 0.5% concentration at 30°C. Phosphite catalyzer acted on this system not only as a reaction accelerator, but also as an improver of properties of this polymer. A tenacious film was prepared as described in Example 13. The resultant film displayed the following mechanical properties: tensile strength, 9.5 kg/mm$^2$ and elongation — 8.1%.

COMPARATIVE EXAMPLE 1

A polymer produced by a process as described in Example 1, except that the concentration of reactants in solution was maintained at 30%. The inherent viscosity of this polymer did not exceed 0.08, even after heating for 20 hours.

COMPARATIVE EXAMPLE 2

A polymer was produced by a process as described in Example 1, except that N,N'-dimethyl acetamide was used as a solvent. The inherent viscosity of this polymer was 0.09 and the film prepared in a manner similar to that described in Example 1 was brittle.

COMPARATIVE EXAMPLE 3

A polymer was prepared by a process as described in Example 1, except that triphenyl phosphite was not added. The inherent viscosity of this polymer was 0.31 and the similarly prepared film exhibited only a tensile strength of 5.7 kg/mm², and an endurance to folding of several times only.

COMPARATIVE EXAMPLE 4

A polymer was prepared by a process as described in Example 13 without adding triphenyl phosphite. The inherent viscosity of this polymer was 0.07 and the similarly casted film was brittle.

COMPARATIVE EXAMPLE 5

A polymer was prepared by a process as described in Example 1 using only isophthalic acid without trimellitic anhydride. The system produced a precipitate and could hardly be stirred; the polymerization reaction could not proceed.

COMPARATIVE EXAMPLE 6

When Example 16 was repeated without adding triphenyl phosphate, the inherent viscosity of the resultant polymer was 0.06. Only a brittle film was produced when the polymer solution was cast.

COMPARATIVE EXAMPLE 7

When the procedure of Example 1 was repeated, using only a m-aminobenzoic acid, the system produced precipitates so that polymerization could not proceed.

The following is claimed:

1. A method of producing a soluble high molecular weight polyamide imide composition which comprises the steps of
   1. polymerizing and ring closing (a) an aromatic diamino compound and (b) an aromatic tribasic carboxylic acid compound having two carboxyl groups attached to adjacent carbon atoms either in acid form or as anhydride, ester, amide, or ammonium salt derivative thereof, in about equimolar ratio, said ester comprising a reaction product of said tricarboxylic acid with an alcohol having 1-8 carbon atoms, said amide comprising a reaction product of said tricarboxylic acid and a secondary amine of an aliphatic cycloaliphatic or aryl radical of $C_1$ to $C_8$ or ammonia, wherein said aromatic diamino compound has 1-3 benzene rings and 6-24 carbon atoms and said tribasic carboxylic acid compound has 1-3 benzene rings and 9-27 carbon atoms, in the presence of about 0.5-15 mol % of phosphorus compound, based on the reactants, selected from the group consisting of

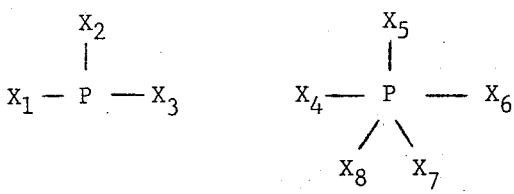

and condensates thereof selected from the group consisting of intra- and inter-molecular condensates, wherein each of $X_1$, $X_2$, $X_3$, $X_4$, $X_5$, $X_6$, $X_7$ and $X_8$ is a member selected from the group consisting of

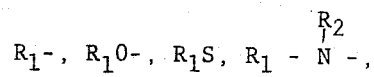

and azido and each of $R_1$ and $R_2$ is a group selected from the group consisting of hydrogen, alkyl having 1-15 carbon atoms, cycloalkyl having 6-20 carbon atoms, aryl having 6-20 carbon atoms and heterocyclic radical having at least one atom of O, S, or N, and having 5 or 6 ring member atoms in an organic solvent selected from the group consisting of an N-substituted lactam having the formula

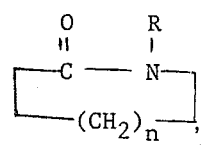

a quinoline having 9-11 carbon atoms and a phenol having 6-18 carbon atoms, wherein R is alkyl having 1-8 carbon atoms or aryl having 6-8 carbon atoms and n is an integer from 3 to 11, at a temperature of from about 200° C to about 350° C with an initial concentration of reactants in the total mixture of 40-90% by weight and
   2. diluting said mixture with said solvent to less than 40% by weight of reactant concentration as the polymerization reaction progresses.

2. The method according to claim 1, wherein said aromatic diamino compound is a member selected from the group consisting of

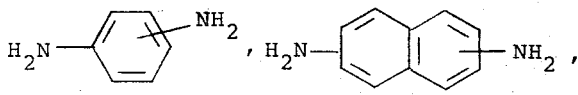

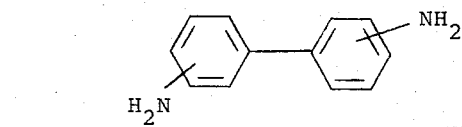

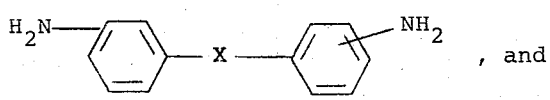, and

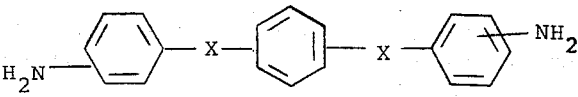

wherein X is a radical selected from the group consisting of alkylene radical having 1 to 3 carbon atoms, —O—, —S—, and —SO₂.

3. The method according to claim 1, wherein said aromatic tribasic carboxylic compound is a member selected from the group consisting of trimellitic acid, trimellitic anhydride, trimellitic acid monoester of alcohol or phenol having 6 to 8 carbon atoms, trimellitic acid monoamide of ammonia or alkyl sec- amine having 2–8 carbon atoms, and/or trimellitic acid monoammonium salt of ammonia, alkyl sec-amine having 2-8 carbon atoms or terta- amine having 3-12 carbon atoms.

4. The method according to claim 1, wherein said organic solvent is one selected from the group consisting of N-methyl pyrrolidone, N-phenyl pyrrolidone, quinoline, isoquinoline and cresol.

5. The method according to claim 1, wherein said phosphorus compound is a member selected from the group consisting of phosphorous acid, phosphoric acid, phenyl phosphorous acid, phenyl phosphoric acid, and derivatives thereof as esters of alcohol selected from the group consisting of alkyl alcohol having 1–8 carbon atoms, phenol and cresol, amides of ammonia or sec-alkyl amine wherein said alkyl has 1–4 carbon atoms, and ammonium salts of ammonia, sec-alkyl amine or tert-alkyl amine wherein said alkyl has 1–4 carbon atoms.

6. The method according to claim 1, wherein a part of said tribasic carboxylic acid compound is replaced with an aromatic dicarboxylic acid or an anhydride, ester, amide, or ammonium salt derivative thereof.

7. The method according to claim 6, wherein said dicarboxylic acid or derivative thereof comprises up to 90 mol % of said total acidic reactants.

8. The method according to claim 6, wherein said dicarboxylic acid or its derivative is isophthalic acid, terephthalic acid, or 4,4'-dicarboxy diphenyl ether, or an ester, amide or ammonium salt thereof.

9. The method according to claim 1, wherein a part of said tribasic carboxylic acid compound and said diamino compound is replaced with an aromatic amino carboxylic acid or its derivative as an ester, an amide, or ammonium salt.

10. The method according to claim 9, wherein said aromatic amino carboxylic acid comprises up to 90 mole % of said total reactant.

11. The method according to claim 9, wherein said amino carboxylic acid is m-amino benzoic acid, p-amino benzoic acid or p-(p-aminophenoxy) benzoic acid, or ester, amide or ammonium salt thereof.

* * * * *